United States Patent
Benhase et al.

(10) Patent No.: US 8,560,771 B2
(45) Date of Patent: *Oct. 15, 2013

(54) EFFICIENT TRACK DESTAGE IN SECONDARY STORAGE

(75) Inventors: Michael T. Benhase, Tucson, AZ (US);
Lokesh M. Gupta, Tucson, AZ (US);
Theodore T. Harris, Jr., Tucson, AZ (US); Joseph S. Hyde, II, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 257 days.

This patent is subject to a terminal disclaimer.

(21) Appl. No.: 13/189,325

(22) Filed: Jul. 22, 2011

(65) Prior Publication Data

US 2013/0024628 A1    Jan. 24, 2013

(51) Int. Cl.
*G06F 12/08*      (2006.01)

(52) U.S. Cl.
USPC .......................................................... 711/113

(58) Field of Classification Search
None
See application file for complete search history.

(56) References Cited

U.S. PATENT DOCUMENTS

| | | | |
|---|---|---|---|
| 6,615,332 B2 | 9/2003 | Yamamato et al. | |
| 7,085,892 B2 | 8/2006 | Martinez et al. | |
| 7,191,207 B2 | 3/2007 | Blount et al. | |
| 7,721,043 B2 | 5/2010 | Gill et al. | |
| 7,725,661 B2 | 5/2010 | Liu et al. | |
| 7,783,836 B2 | 8/2010 | Wang | |
| 7,793,049 B2 | 9/2010 | Cain et al. | |
| 7,805,574 B2 | 9/2010 | Bell, Jr. et al. | |
| 2003/0225948 A1 | 12/2003 | Jarvis et al. | |
| 2007/0156961 A1 | 7/2007 | Houzenga et al. | |
| 2010/0037226 A1 | 2/2010 | Benhase et al. | |

OTHER PUBLICATIONS

Young Jin Nam et al., "An Adaptive High-Low Water Mark Destage Algorithm for Cached RAID5", Proceedings 2002 Pacific Rim International Symposium on Dependable Computing, Dec. 16-18, 2002, Tsukuba City, Ibaraki, Japan, 8 pages.
U.S. Appl. No. 12/965,131, filed Dec. 10, 2010, entitled "Systems and Methods for Managing Cache Destage Scan Times".
U.S. Appl. No. 12/965,133, filed Dec. 10, 2010, entitled "Systems and Methods for Managing Destage Conflicts".
U.S. Appl. No. 12/965,141, filed Dec. 10, 2010, entitled "Systems and Methods for Background Destaging Storage Tracks".
U.S. Appl. No. 12/965,174, filed Dec. 10, 2010, entitled "Systems and Methods for Destaging Storage Tracks From Cache".

*Primary Examiner* — Duc Doan
(74) *Attorney, Agent, or Firm* — Griffiths & Seaton PLLC

(57) ABSTRACT

For efficient track destage in secondary storage in a more effective manner, for temporal bits employed with sequential bits for controlling the timing for destaging the track in a primary storage, the temporal bits and sequential bits are transferred from the primary storage to the secondary storage. The temporal bits are allowed to age on the secondary storage.

13 Claims, 7 Drawing Sheets

EFFICIENT TRACK DESTAGE IN SECONDARY STORAGE

BACKGROUND OF THE INVENTION

1. Field of the Invention

The present invention relates generally to computers, and more particularly, to efficient track destage in secondary storage in a computing storage environment.

2. Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. The disk drives may be configured in an array, such as a Redundant Array of Independent Disks (RAID) topology, to provide data security in the event of a hardware or software failure. The data storage systems may be connected to a host, such as a mainframe computer. The disk drives in many data storage systems have commonly been known as Direct Access Storage Devices (DASD). DASD devices typically store data on a track from which information may be recorded and read. In these storage systems, tracks may be destaged from primary to secondary storage systems. However, the destaging processes within the storage systems are not as effective as they otherwise could be when there are tracks being written to repeatedly within the primary and/or secondary systems.

SUMMARY OF THE DESCRIBED EMBODIMENTS

In a data processing system or computing environment, primary storage systems have tracks that are being written to repeatedly. Efficiency may be enhanced when tracks are prevented from being prematurely destaged for the continually updated tracks. However, limitations for preventing the destaging of tracks too quickly compromise the temporal locality of the primary and/or secondary storage systems. Thus, when the tracks are transferred from the primary storage system to the secondary storage system the ability to prevent the tracks that are being written to repeatedly from being prematurely destaged is unavailable. This creates destage conflicts on the secondary storage. As a result, efficiency and productivity is reduced.

Accordingly, and in view of the foregoing, various exemplary system, and computer program product embodiments for efficient track destage in secondary storage in a more effective manner, are provided. In one embodiment, by way of example only, for temporal bits employed with sequential bits for controlling the timing for destaging the track in a primary storage, the temporal bits and sequential bits are transferred from the primary storage to the secondary storage. The temporal bits are allowed to age on the secondary storage.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

Figure 1:
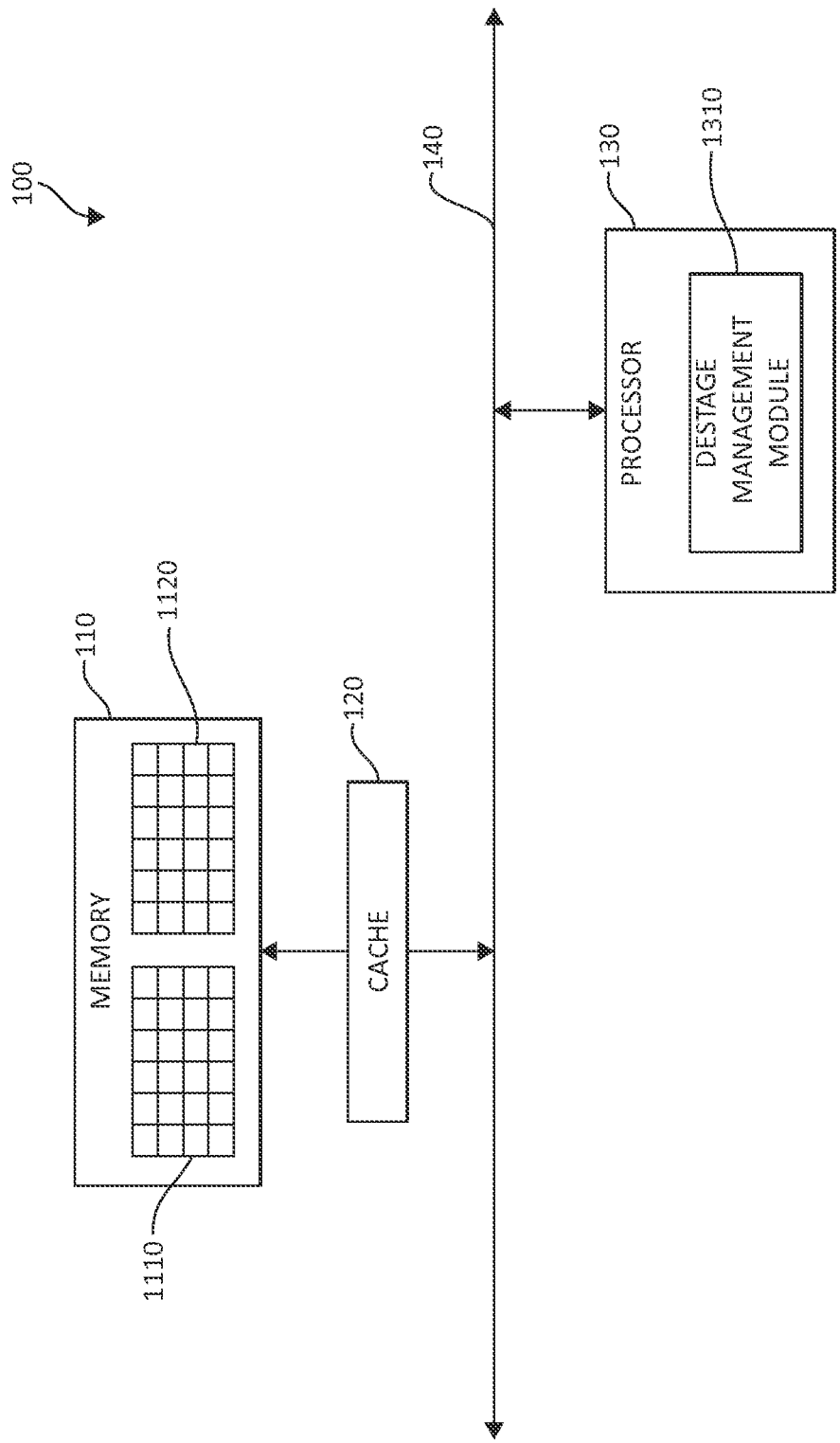
FIG. 1 illustrates an exemplary block diagram showing a system for destaging storage tracks from a cache utilizing a multi-bit counter.

Within a storage system, there are multiple temporal bits (or clock bits) for modified tracks in a cache. The tracks that are being written to repeatedly will have higher temporal bit value to allow the track to remain longer in the cache. As a write operation occurs on a track, the temporal bit value may be incremented. This enables tracks that are continually updated/modified from being destaged too quickly or prematurely. Such a process improves the write throughput of the storage controller and enables a reduction of long input/out (I/O) exceptions on host writes, since a host write is less likely to hit a track that is being destaged. The main drawback may be that multiple clock bits are only kept and updated in the primary storage system. When the tracks are transferred to a secondary storage system, the temporal bit values for the track is lost and/or unavailable in the secondary storage. As a result, the tracks that are frequently updated or being modified in the secondary storage are being destaged too early, which in turn causes more frequent long I/Os exceptions on host writes, for example, on a peer-to-peer remote copy (PPRC) primary system since the host write is less likely to hit a track that is being destaged on secondary. Such problems occur with asynchronous transfers (Global Mirror, asynchronous PPRC and PPRC establish) since synchronous PPRC tracks are written at the same time on primary and secondary. Thus, transferring clock bits in synchronous PPRC fails to address the problem.

In contrast, and to address the inefficiencies previously described, the mechanisms of the illustrated embodiments serve to perform the efficient track destage in secondary storage by sending temporal bits and sequential bits, that control the timing for destaging the track in a primary storage, to a secondary storage system to enhance temporal locality. In one embodiment, by way of example only, for temporal bits employed with sequential bits for controlling the timing for destaging the track in a primary storage, the temporal bits and sequential bits are transferred from the primary storage to the secondary storage. The temporal bits are allowed to age on the secondary storage.

In one embodiment, there may be control blocks including a sequential track and a Write-ahead data set (WADS) track along with a clock counter. If the clock count is non-zero, the mechanisms of the present invention do not destage the track since it is likely the host will write to the track at least one more time. Destaging a track at this points presents the following problems. First, the host is required to wait for the destaging of the track (e.g., a destage conflict). Second, the track will need to be destaged again. The clock count is decremented (eventually to zero) as described below in FIG. 3. In one embodiment, by way of example only, when the clock count is zeroed the track may be destaged. There are two types of sequential destaging. A typical sequential where the clock count is zeroed for the track X-M when track "X" is written to by the host. Most of the tracks may be written to in this way. The second type, a WADS "sequential" occurs by skipping some tracks and write a preceding track over again.

As previously described, the mechanisms of the illustrated embodiments increase the efficiency and performance, for example, by transferring the temporal and sequential bits from a primary storage system to a secondary storage system. This information may be saved and used to age out (by decrementing the temporal bits) tracks in the secondary storage for those tracks that were transferred from the primary storage. The temporal bits on the primary the secondary storage may be incremented, as a write operation occurs on a track. As a track ages, the temporal bits may be decremented as time passes for a track where a write operation is not performed. Both the incrementing and the decrementing of the temporal bits may occur on the primary and secondary storage as described in the illustrated embodiments.

Turning now to the figures, FIG. 1 illustrates an exemplary block diagram showing a system for incrementing and decrementing temporal bits utilizing a multi-bit counter and destaging storage tracks. At least in the illustrated embodiment, system 100 comprises a memory 110 coupled to a cache 120 and a processor 130 via a bus 140 (e.g., a wired and/or wireless bus).

Memory 110 may be any type of memory device known in the art or developed in the future. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing.

In the various embodiments of memory 110, storage tracks 1110 are capable of being stored in memory 110 and each storage track 1110 comprises a counter 1120. In one embodiment, each counter 1120 is a four-bit (4-bit) counter. In other embodiments, each counter 1120 is a two-bit (2-bit) counter or a three-bit (3-bit) counter. In still other embodiments, each counter 1120 includes a number of bits greater than four (4) bits. Furthermore, each of the storage tracks 1110 can be individually or collectively destaged to memory 110 from cache 120 when data is written to the storage track(s) 1110.

Cache 120, in one embodiment, comprises a write cache partitioned into one or more ranks, where each rank includes one or more storage tracks 1110. As such, cache 120 may be any cache known in the art or developed in the future.

During operation, the storage tracks 1110 in each rank may be destaged to memory 110 in a foreground destaging process after the storage tracks 1110 have been written to. That is, the foreground destage process destages storage tracks 1110 from the ranks to memory 110 while a host (not shown) is actively writing to various storage tracks 1110 in the ranks of cache 120. Ideally, a particular storage track 1110 is not being destaged when one or more hosts desire to write to the particular storage track 1110, which is known as a destage conflict, and cache 120 does not experience large fluctuations between being nearly full and nearly empty, which is known as oscillation. To reduce the number of destage conflicts and to reduce the time in which the storage tracks reside in cache 120, processor 130 is configured to execute a method for incrementing and decrementing temporal bits on a primary and secondary storage system utilizing the counter 1120 associated with each storage track 1110 in cache 120.

In various embodiments, processor 130 comprises or has access to a destage management module 1310, which comprises computer-readable code that, when executed by processor 130, causes processor 130 to assist in transferring the temporal bits and the plurality of sequential bits from the primary storage to the secondary storage and destaging storage tracks from cache utilizing the counter 1120 associated with each storage track 1110 in cache 120. The destage management module 1310 may perform singularly, or in combination with the processor and/or other devices, the operations for transferring the temporal bits and the sequential bits from the primary storage to the secondary storage and allowing the temporal bits to age on either the primary and/or secondary storage systems. When executing the computer-readable code in destage management module 1310, processor 130 may be configured to utilize a first thread to write data to storage tracks 1110 and increment the counter 1120 on each respective storage track 1110 a predetermined amount each time processor 130 writes to a respective storage track 1110. In one embodiment, processor 130 may be configured to increment each counter 1120 on each respective storage track 1110 three (3) counts each time processor 130 writes to a respective storage track 1110. In another embodiment, processor 130 is configured to increment each counter 1120 on each respective storage track 1110 one (1) count or two (2) counts each time processor 130 writes to a respective storage track 1110. In yet another embodiment, processor 130 is configured to increment each counter 1120 on each respective storage track 1110 a number of counts greater than three counts each time processor 130 writes to a respective storage track 1110.

In one embodiment, each counter 1120 is a four-bit counter including a count range of, for example, 0-15 and the predetermined increment amount is three (3) counts. In this embodiment, processor 130 is configured to increment the counter 1120 associated with a particular storage track 1110 three (3) counts each time processor 130 writes to the particular storage track 1110. As such, each counter 1120 in this embodiment is capable of tracking five consecutive write operations (i.e., 15 counts divided by 3 counts per write=5 writes) on each respective storage track 1110.

Other embodiments, contemplate the use of counters 1120 including different bit sizes and/or a different predetermined increment amount each time processor 130 writes to a storage track 1110. That is, the various embodiments of processor 130 may use any combination of bit sizes for counters 1120 and predetermined increment amounts (e.g., a two-bit counter and one count per write (i.e., tracks 3 writes from processor 130 for each storage track 1110), a three-bit counter and one count per write (i.e., tracks 7 writes from processor 130 for each storage track 1110), a four-bit counter and five counts per write (i.e., tracks 3 writes from processor 130 for each storage track 1110), a six-bit counter and 7 counts per write (i.e., tracks 9 writes from processor 130 for each storage track 1110), etc.).

Processor 130, when utilizing the first thread, is further configured to destage storage tracks 1110 based on the spatial location of storage tracks 1110. A sorted list of storage tracks 1110 is maintained in processor 130 (e.g., in destage management module 1310) using a balanced tree. During a destage scan, the temporal bits may be aged out by decrementing the counter 1120. Thus, the temporal bits on the secondary are aged out for the transferred tracks from the primary storage system. The operations of the destage scam may be performed as follows. Destage scans looking for storage tracks 1110 to destage may traverse the balanced tree in the order of storage track location from the storage track 1110 including the lowest number to the storage track including the highest number, for example.

For sequential storage tracks 1110, the destage mechanisms discussed below ignore counters 1120 and destage sequential storage tracks 1110 when the destage scan comes across such sequential storage tracks 1110. This is designed to improve throughput since, for sequential storage tracks 1110, generally the entire stride is in cache 120. As a result, full stride destages may be accomplished, which are generally faster than partial stride destages. This scenario leads to freeing write space in cache 120 more quickly. In addition, throughput increases as sequential storage tracks 1110 are not continually re-written.

The processor 130 may be configured to examine a current storage track 1110 to determine if it is sequential in nature with respect to a previous storage track 1110. If the current storage track 1110 is sequential in nature, processor 130 may be configured to locate a storage track 1110 that includes a location that is a predetermined number of storage tracks prior to the location of the current storage track (e.g., N-X locations). In other words, an earlier storage track in the stride is located, based on a predetermined formula. In one embodiment, by default, the predetermined number is twenty-eight (28) storage tracks 1110, although one of ordinary skill in the art will appreciate that the predetermined number may vary according to a particular application of system 100.

If the located storage track 1110 (i.e., the storage track 1110 that is located N-X storage tracks prior to the current storage track 110) is sequential with respect to the current storage track 1110 and has been modified, its associated counter 1120 is cleared or zeroed out. If the located storage track 1110 is not sequential with respect to the current storage track 1110 or has not been modified, the counter 1120 associated with the located storage track 1110 is not cleared or zeroed out. Processor 130 is further configured to perform a destage scan of storage tracks 1110 to destage storage tracks 1110 from cache 120.

When executing the computer-readable code in destage management module 1310, processor 130 is further configured to utilize a second thread to perform the destage scan, which decrements counters 1120 and destages storage tracks 1110 including a counter 1120 with a zero count. Specifically, processor 130 is configured to determine the amount of time a previous destage scan, divide this amount of time by a predetermined amount of time, and decrement each counter 1120 by this number of counts, truncated (or rounded down), and additionally decremented by one count.

In one embodiment, the predetermined amount of time that the previous destage scan time is divided by is 100 milliseconds. In other embodiments, the predetermined amount of time that the previous destage scan time is divided by is an amount of time less than 100 milliseconds. In yet another embodiment, the predetermined amount of time that the previous destage scan time is divided by is an amount of time greater than 100 milliseconds. Accordingly, the various embodiments of processor 130 contemplate that the predetermined amount of time that the previous destage scan time is divided by may be any predetermined amount of time. For example, if the previous destage scan time was 280 milliseconds and the predetermined amount is 100 milliseconds, processor 130 will decrement each counter 1120 by three (3) counts (i.e., (280 ms/100 ms) counts+1 count=3 counts) during the current destage scan.

In addition to decrementing counters 1120 during the current destage scan, processor 130 is configured to destage each storage track 1110 that includes an associated counter 1120 with a zero count. In addition, during the current destage scan processor 130 is configured to "skip" destaging each storage track 1110 that includes an associated counter 1120 with a count greater than zero. To accomplish this, processor 130 is configured to check each counter 1120 of each respective storage track 1110 during the destage scan. If the count on the counter 1120 for a particular storage track 1110 is greater than zero, processor 130 is configured to decrement the counter 1120 by the determined decrement amount for this particular destage scan and continue on to the next storage track 1110. If the count on the counter 1120 for a particular storage track 1110 is zero, processor 130 is configured to destage this particular storage track 1110.

Notably, if the count on the counter 1120 for a particular storage track 1110 is greater than zero, but less than the determined decrement amount for this particular destage scan, processor 130 is configured to zero out the counter 1120 for this particular destage scan and continue on to the next storage track 1110. For example, if the on the counter 1120 for a particular storage track 1110 is two (2) counts and the determined decrement amount for this particular destage scan is three (3), processor 130 will zero out the counter 1120 and continue on to the next storage track 1110.

Figure 2:
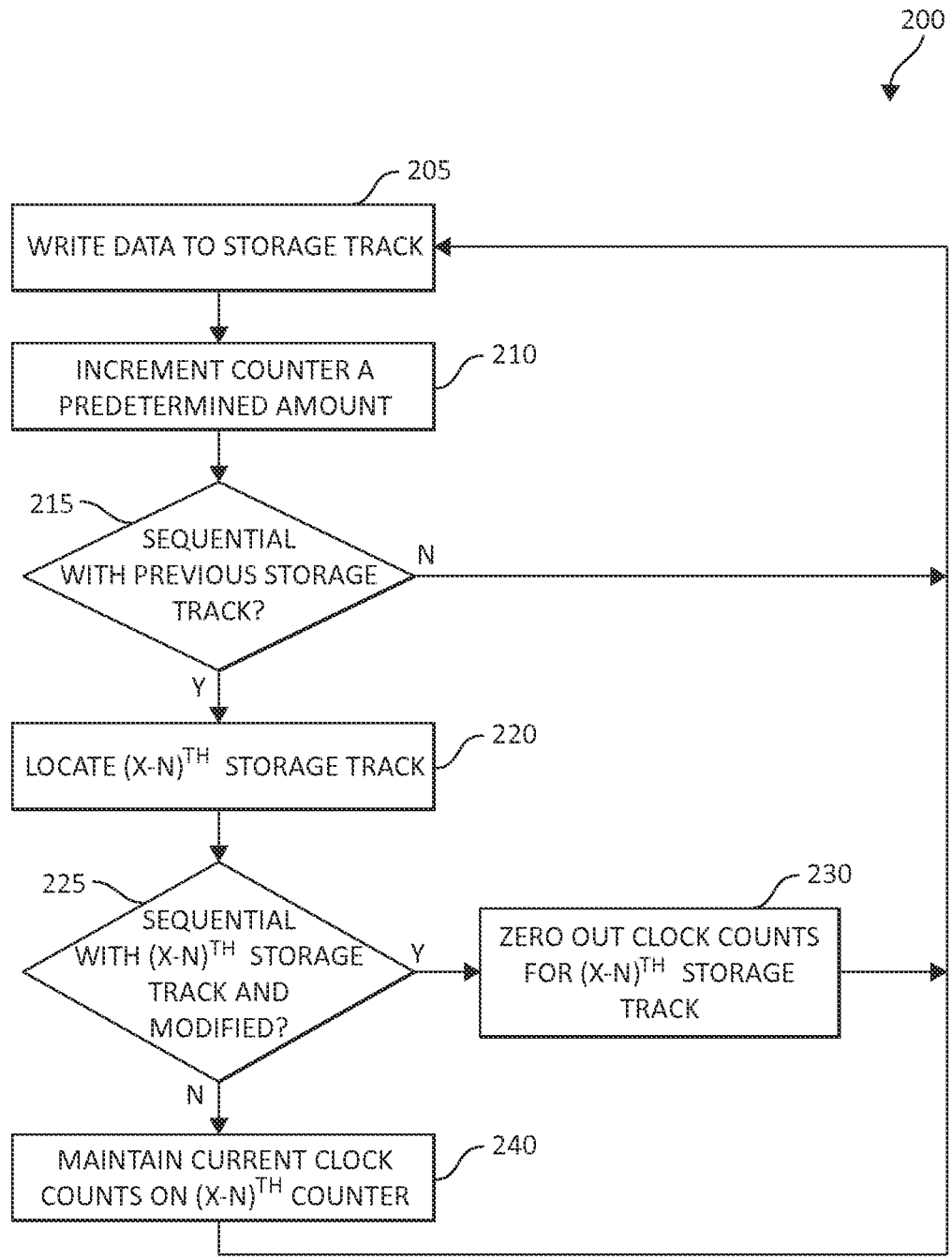
FIG. 2 is a flowchart illustrating an exemplary method for writing data to a plurality of storage tracks and incrementing a multi-bit counter in the cache of FIG. 1 in which aspects of the present invention may be realized.

Turning now to FIG. 2, FIG. 2 is a flowchart illustrating an exemplary method for writing data to a plurality of storage tracks and incrementing a multi-bit counter of (e.g., storage tracks 1110) and incrementing each counter (e.g., counters 1120) in a cache (e.g., cache 120). At least in the illustrated embodiment, method 200 begins by a processor (e.g., processor 130) writing data to one or more storage tracks (block 205) and incrementing the counter associated each storage track that was written to by a predetermined amount (block 210).

In one embodiment, the predetermined amount that each counter is incremented is three (3) counts (the term counts, temporal bits, may be indicated and referred to as clock counts) each time the processor writes to a respective storage track. In another embodiment, the predetermined amount that each counter is incremented is one (1) count or two (2) counts each time the processor writes to a respective storage track. In yet another embodiment, the predetermined amount that each counter is incremented is a number of counts greater than three counts each time the processor writes to a respective storage track.

The incrementing of the temporal bits (multi-bit counter), when writing data to storage tracks allow the tracks that are being written to repeatedly have higher values so the tracks may remain longer in the cache without being destaged too quickly. Alternatively, the tracks that are written to less frequently, or not at all, may have the temporal bits (multi-bit counter) decremented to lower the temporal bits value thereby "aging" the temporal bits. Thus, by incrementing the temporal bits and/or aging the temporal bit by decrementing the temporal bits, the mechanisms of the present invention provide for increased efficiency for destaging a track when temporal bits employed with sequential bits for controlling the timing for destaging the track in a primary storage. The temporal bits and the sequential bits are transferred from the primary storage to the secondary storage. The temporal bits are allowed to age on the secondary storage.

Method 200 further comprises determining if the storage track that is currently being written to is sequential with respect to the immediately previous storage track that was written to (block 215). If the storage track that is currently being written to is not sequential with respect to the immediately previous storage track that was written to, method 200 comprises returning to writing to the one or more storage tracks (block 205).

If the storage track that is currently being written to is sequential with respect to the immediately previous storage track that was written to, method 200 comprises locating a storage track that includes a location that is a predetermined number of storage tracks prior to the location of the current storage track (e.g., N-X locations) (block 220). In other words, an earlier storage track in the stride is located, based on a predetermined formula. In one embodiment, by default, the predetermined number is twenty-eight (28) storage tracks, although one skilled in the art will appreciate that the predetermined number may vary according to a particular application.

Method 200 further comprises determining if the located storage track (i.e., the storage track that is located N-X storage tracks prior to the current storage track (e.g., 28 storage tracks prior to the current storage track)) is sequential with respect to the current storage track and has been modified (block 225). If the located storage track is sequential with respect to the current storage track and has been modified, its associated counter 1120 is cleared or zeroed out (block 230). Method 200 then returns to writing to the one or more storage tracks (block 205).

If the located storage track is not sequential with respect to the current storage track and/or has not been modified, method 200 comprises maintaining the count (e.g., not clearing or zeroing out) on its associated counter 1120 (block 240). Method 200 then returns to writing to the one or more storage tracks (block 205).

Figure 3:
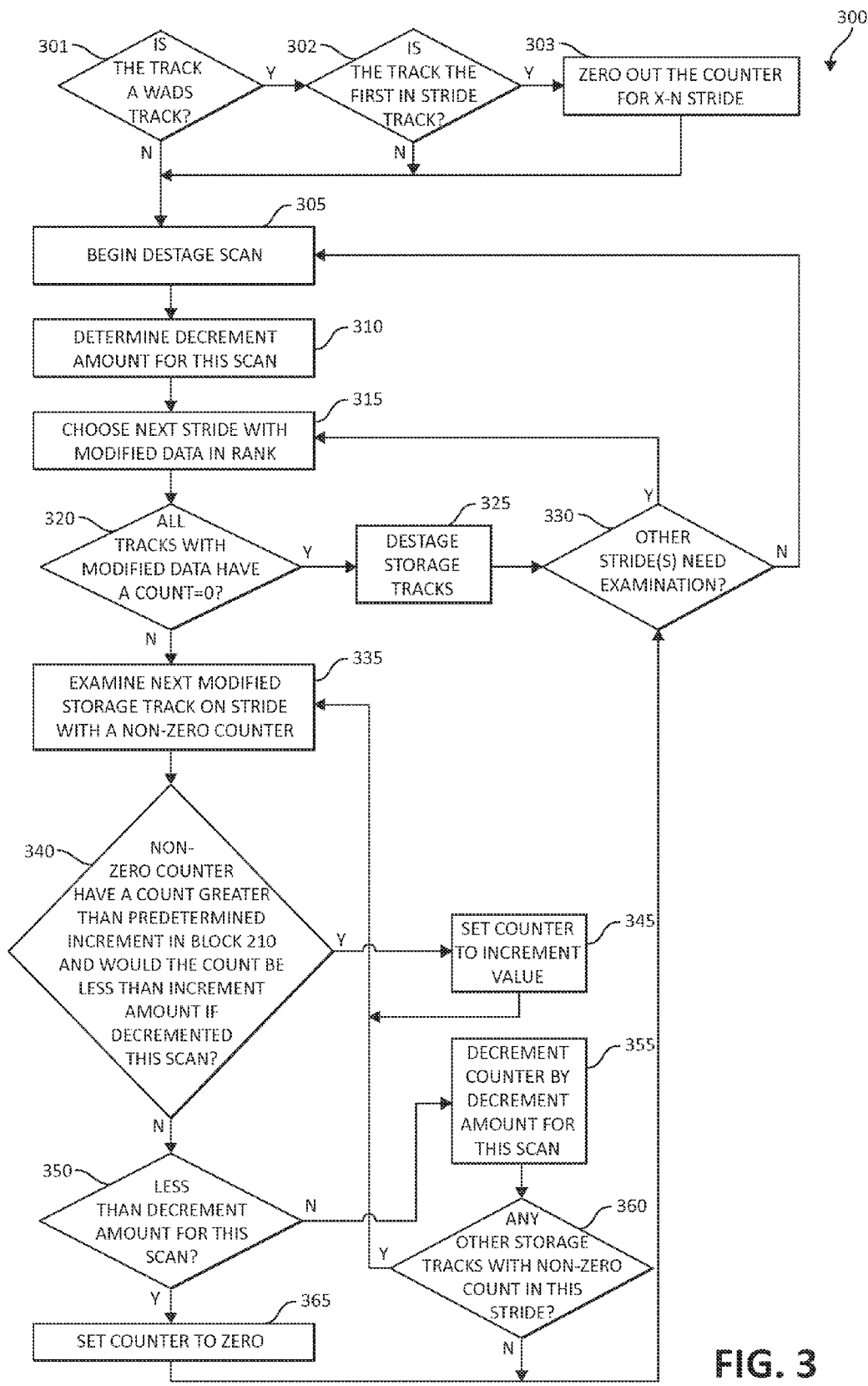
FIG. 3 is a flowchart illustrating an exemplary method for destaging storage tracks from the cache in FIG. 1 utilizing a multi-bit counter.

With reference now to FIG. 3, FIG. 3 is a flow diagram of one embodiment of a method 300 for destaging storage tracks (e.g., storage tracks 1110) from a cache (e.g., cache 120) utilizing multi-bit counters (e.g., counter 1120). At least in the illustrated embodiment, method 300 begins by beginning by determining if the track is a WADS track (step 301). If the track is not a WADS track, the method 300 will determine if the track is the first in stride track (step 302). If the track is a first in stride the method will zero out the counter for X-N stride (step 303). When the first track in stride X is written the clock count bits are zeroed for all tracks in stride X-N. A sequential track(s) may be numbered, by way of example only, as 99, 100, 101, 102, 103, 104, 105, and 106. The zero count in track X-N may be illustrated as M equal to 5 so track X-N may be seen as track X (X being indicated in this example as 105) minus N tracks. The "N" may be indicated by a value such as five, thus track X-M may be viewed as 105 minus 5 represents track 100. Moreover, if the track was a WADS sequential track, the tracks may be numbered, by way of example only, as 95, 100, 101, 103, 104, 106, and 108. Since the WADS wrote the track 100, but not 105, the algorithm (e.g., the method of operation) does not work to clear the count in the track 100 since track 105 was skipped by the WADS track. If the track is neither a WADS track nor the first in stride track, the method will begin to perform a destage scan (block 305). During the destage scan, method 300 comprises determining an amount to decrement each counter during the destage scan (block 310). In one embodiment, the amount to decrement each counter during the destage scan comprises determining the amount of time of a previous destage scan, dividing this amount of time by a predetermined amount of time, truncating (or rounding down) the result, and adding one additional count. In various embodiments, the predetermined amount of time that the previous destage scan time is divided by is 100 milliseconds. In other embodiments, the predetermined amount of time that the previous destage scan time is divided by is an amount of time less than 100 milliseconds. In yet another embodiment, the predetermined amount of time that the previous destage scan time is divided by is an amount of time greater than 100 milliseconds. Accordingly, the various embodiments contemplate that the predetermined amount of time that the previous destage scan time is divided by may be any predetermined amount of time. For example, if the previous destage scan time was 310 milliseconds and the predetermined amount is 100 milliseconds, the amount to decrement each counter during the destage scan is four (4) counts (i.e., (310 ms/100 ms) counts+1 count=4 counts).

Method 300 further comprises examining the counter associated with a particular storage track (block 315) and determining if the count on the counter is zero (block 320). If the count on the counter for the particular storage track is zero, method 300 comprises destaging this particular storage track (block 325). Method 300 then determines if there are other storage tracks in the cache that need to be examined during the current destage scan (block 330).

If there are one or more other storage tracks in the cache that need to be examined during the current destage scan, method 300 examines the next storage track (block 315). If there are no other storage tracks in the cache that need to be examined during the current destage scan, method 300 begins the next destage scan (block 305).

If the count on the counter for the particular storage track is greater than zero or is non-zero (see block 320), method 300 comprises decrementing the counter associated with this particular storage track by the determined decrement amount for this particular destage scan (block 335). Method 300 then determines if there are other storage tracks in the cache that need to be examined during the current destage scan (block 330).

If there are other storage tracks in the cache that need to be examined during the current destage scan, method 300 examines the next storage track (block 315). If there are no other storage tracks in the cache that need to be examined during the current destage scan, method 300 begins the next destage scan (block 305).

By employing these illustrated embodiments singularly and/or in conjunction with each other, the mechanisms effectively assist in performing the efficient track destage in secondary storage for sending temporal bits and sequential bits, that control the timing for destaging the track in a primary storage, to a secondary storage system to enhance temporal locality. Additional hardware structures illustrated below provide alternative embodiments for the mechanisms of the present invention.

Figure 4A:
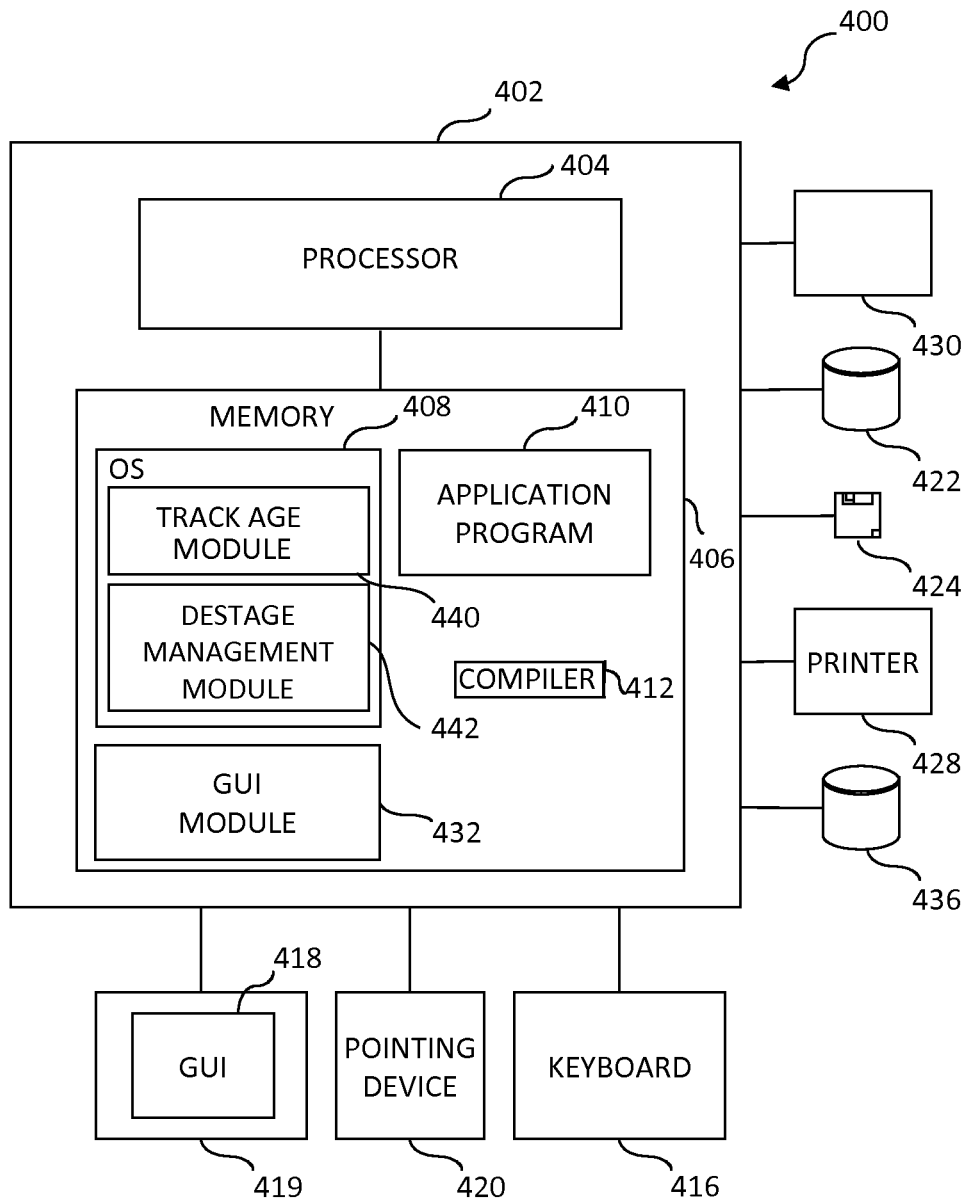
FIG. 4A illustrates an exemplary computing device including a processor device in a computing environment in which aspects of the present invention may be implemented.

FIG. 4A illustrates a portion 400 of an exemplary computer environment that may be used to implement embodiments of the present invention. A computer 402 comprises a processor 404 and a memory 406, such as random access memory (RAM). The computer 402 is operatively coupled to a display 419, which presents images such as windows to the user on a graphical user interface 418. The computer 402 may be coupled to other devices, such as a keyboard 416, a mouse device 420, a printer 428, etc. Of course, those skilled in the art will recognize that any combination of the above components, or any number of different components, peripherals, and other devices, may be used with the computer 402.

Generally, the computer 402 operates under control of an operating system (OS) 408 (e.g. z/OS, OS/2, LINUX, UNIX, WINDOWS, MAC OS) stored in the memory 406, and interfaces with the user to accept inputs and commands and to present results, for example through a graphical user interface (GUI) module 432. In one embodiment of the present invention, the OS 408 facilitates the backup mechanisms. Although the GUI module 432 is depicted as a separate module, the instructions performing the GUI functions can be resident or distributed in the operating system 408, the application program 410, or implemented with special purpose memory and processors. OS 408 includes a track age module 440 and destage management module 442 which may be adapted for carrying out various processes and mechanisms in the exemplary embodiments described below, such as performing the efficient destaging of tracks, for temporal bits employed with sequential bits for controlling the timing for destaging the track in a primary storage, by transferring the temporal bits and sequential bits from the primary storage to the secondary storage and allowing the temporal bits, which were passed from the primary to the secondary, to age on the secondary storage. The track age module 440 and destage management module 442 may be implemented in hardware, firmware, or a combination of hardware and firmware. In one embodiment, the track age module 440 and the destage management module, may be configured individually or in conjunction to perform all of the incrementing and decrementing of temporal bits or clock bits and/or processes needed to execute the mechanisms of the illustrated embodiments. In one embodiment, the track age module 440 and destage management module 442 may be embodied as an application specific integrated circuit (ASIC). As the skilled artisan will appreciate, functionality associated with the track age module 440 and destage management module 442 may also be embodied, along with the functionality associated with the processor 404, memory 406, and other components of computer 402, in a specialized ASIC known as a system on chip (SoC). Further, the functionality associated with the track age module and destage management module 442 (or again, other components of the computer 402) may be implemented as a field programmable gate array (FPGA).

As depicted in FIG. 4A, the computer 402 includes a compiler 412 that allows an application program 410 written in a programming language such as COBOL, PL/1, C, C++, JAVA, ADA, BASIC, VISUAL BASIC or any other programming language to be translated into code that is readable by the processor 404. After completion, the computer program 410 accesses and manipulates data stored in the memory 406 of the computer 402 using the relationships and logic that was generated using the compiler 412. The computer 402 also optionally comprises an external data communication device 430 such as a modem, satellite link, Ethernet card, wireless link or other device for communicating with other computers, e.g. via the Internet or other network.

Data storage device 422 is a direct access storage device (DASD) 422, including one or more primary volumes holding a number of datasets. DASD 422 may include a number of storage media, such as hard disk drives (HDDs), solid-state devices (SSD), tapes, and the like. Data storage device 436 may also include a number of storage media in similar fashion to device 422. The device 436 may be designated as a backup device 436 for holding backup versions of the number of datasets primarily stored on the device 422. As the skilled artisan will appreciate, devices 422 and 436 need not be located on the same machine. Devices 422 may be located in geographically different regions, and connected by a network link such as Ethernet. Devices 422 and 436 may include one or more volumes, with a corresponding volume table of contents (VTOC) for each volume. Each of the devices 422 may be configured to be a primary storage system or a secondary storage system.

In one embodiment, instructions implementing the operating system 408, the computer program 410, and the compiler 412 are tangibly embodied in a computer-readable medium, e.g., data storage device 420, which may include one or more fixed or removable data storage devices 424, such as a zip drive, floppy disk, hard drive, DVD/CD-ROM, digital tape, flash memory card, solid state drive, etc., which are generically represented as the storage device 424. Further, the operating system 408 and the computer program 410 comprise instructions which, when read and executed by the computer 402, cause the computer 402 to perform the steps necessary to implement and/or use the present invention. For example, the computer program 410 may comprise instructions for implementing the grid set manager, grid manager and repository manager previously described. Computer program 410 and/or operating system 408 instructions may also be tangibly embodied in the memory 406 and/or transmitted through or accessed by the data communication device 430. As such, the terms "article of manufacture," "program storage device" and "computer program product" as may be used herein are intended to encompass a computer program accessible and/or operable from any computer readable device or media.

Embodiments of the present invention may include one or more associated software application programs 410 that include, for example, functions for managing a distributed computer system comprising a network of computing devices, such as a storage area network (SAN). Accordingly, processor 404 may comprise a storage management processor (SMP). The program 410 may operate within a single computer 402 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Figure 4B:
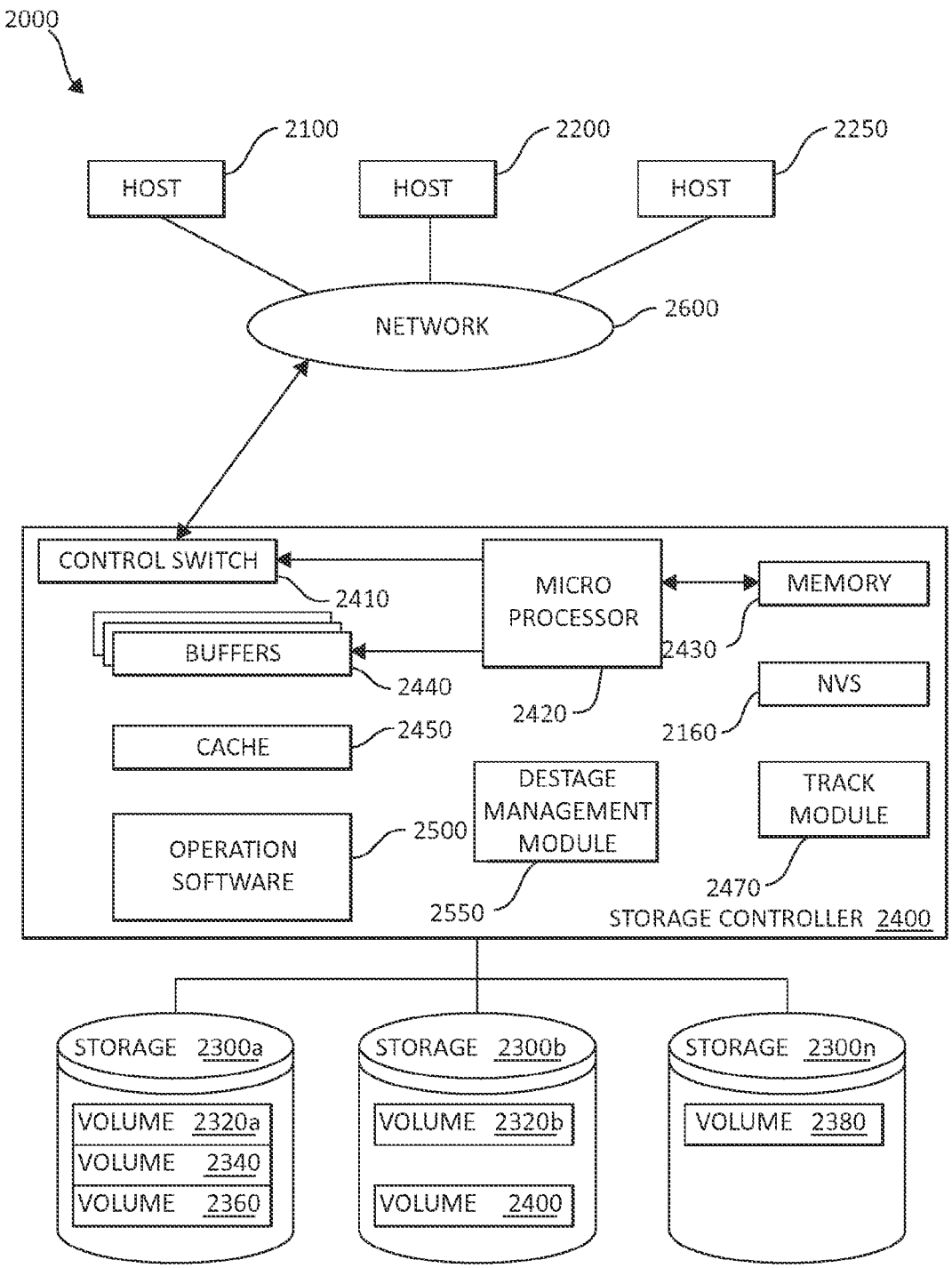
FIG. 4B illustrates an exemplary block diagram showing a hardware structure of a data storage system in a computer system in which aspects of the present invention may be realized.

FIG. 4B is an exemplary block diagram 2000 showing a hardware structure of a data storage system in a computer system according to the present invention. Host computers 4100, 2200, 2250, are shown, each acting as a central processing unit for performing data processing as part of a data storage system 2000. The data storage system may be a primary and a secondary storage environment. The hosts (physical or virtual devices), 2100, 2200, and 2250 may be one or more new physical devices or logical devices to accomplish the purposes of the present invention in the data storage system 2000. In one embodiment, by way of example only, a data storage system 2000 may be implemented as IBM® System Storage™ DS8000™. A Network connection 2600 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 2100, 2200, and 2250 may be local or distributed among one or more locations and may be equipped with any type of fabric (or fabric channel) (not shown in FIG. 4B) or network adapter 2600 to the storage controller 2400, such as Fibre channel, FICON, ESCON, Ethernet, fiber optic, wireless, or coaxial adapters. Data storage system 2000 is accordingly equipped with a suitable fabric (not shown in FIG. 4B) or network adapter 2600 to communicate. Data storage system 2000 is depicted in FIG. 4B comprising storage controller 2400 and storage 2300.

To facilitate a clearer understanding of the methods described herein, storage controller 2400 is shown in FIG. 4B as a single processing unit, including a microprocessor 2420, system memory 2430 and nonvolatile storage ("NVS") 2160, which will be described in more detail below. It is noted that in some embodiments, storage controller 2400 is comprised of multiple processing units, each with their own processor complex and system memory, and interconnected by a dedicated network within data storage system 2000. Storage 2300 may be comprised of one or more storage devices, such as storage arrays, which are connected to storage controller 2400 by a storage network.

In some embodiments, the devices included in storage 2300 may be connected in a loop architecture. Storage controller 2400 manages storage 2300 and facilitates the processing of write and read requests intended for storage 2300. The system memory 2430 of storage controller 2400 stores program instructions and data, which the processor 2420 may access for executing the functions, and method steps associated with managing storage 2300 of the present invention for efficient destaging of a track in a computing environment having a primary and secondary storage system. The devices in the storage controller 2400 manage and facilitate, for temporal bits employed with sequential bits for controlling the timing for destaging the track in a primary storage, transferring the temporal bits and sequential bits from the primary storage to the secondary storage. The components and devices within the storage controller 2400 are configured to work collectively or individually to assist and/or allow the temporal bits to age on the secondary storage by and/or other relevant devices as known in the art or developed in the future.

In one embodiment, system memory 2430 includes, is associated, or is in communication with the operation software 2500 for performing the efficient destaging of tracks, for temporal bits employed with sequential bits for controlling the timing for destaging the track in a primary storage, by transferring the temporal bits and sequential bits from the primary storage to the secondary storage and allowing the temporal bits, which were passed from the primary to the secondary, to age on the secondary storage. As shown in FIG. 4B, system memory 2430 may also include or be in communication with a cache 2450 for storage 2300, also referred to herein as a "cache memory", for buffering "write data" and "read data", which respectively refer to write/read requests and their associated data. In one embodiment, cache 2450 is allocated in a device external to system memory 2430, yet remains accessible by microprocessor 2420 and may serve to provide additional security against data loss, in addition to carrying out the operations as described in herein.

In some embodiments, cache 2450 is implemented with a volatile memory and non-volatile memory and coupled to microprocessor 2420 via a local bus (not shown in FIG. 4B) for enhanced performance of data storage system 2000. The NVS 2160 included in data storage controller is accessible by microprocessor 2420 and serves to provide additional support for operations and execution of the present invention as described in other figures. The NVS 2160, may also referred to as a "persistent" cache, or "cache memory" and is implemented with nonvolatile memory that may or may not utilize external power to retain data stored therein. The NVS may be stored in and with the cache 2450 for any purposes suited to accomplish the objectives of the present invention. In some embodiments, a backup power source (not shown in FIG. 4B), such as a battery, supplies NVS 2160 with sufficient power to retain the data stored therein in case of power loss to data storage system 2000. In certain embodiments, the capacity of NVS 2160 is less than or equal to the total capacity of cache 2450.

Storage 2300 may be physically comprised of one or more storage devices, such as storage arrays. A storage array is a logical grouping of individual storage devices, such as a hard disk. In certain embodiments, storage 2300 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 4B may include a logical volume, or simply "volume," may have different kinds of allocations. Storage 2300*a*, 2300*b* and 2300*n* are shown as ranks in data storage system 2000, and are referred to herein as rank 2300*a*, 2300*b* and 2300*n*. Ranks may be local to data storage system 2000, or may be located at a physically remote location. In other words, a local storage controller may connect with a remote storage controller and manage storage at the remote location. Rank 2300*a* is shown configured with two entire volumes, 2340 and 2360, as well as one partial volume 2320*a*. Rank 2300*b* is shown with another partial volume 2320*b*. Thus volume 2320 is allocated across ranks 2300*a* and 2300*b*. Rank 2300*n* is shown as being fully allocated to volume 2380—that is, rank 2300*n* refers to the entire physical storage for volume 2380. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 2400 may include a destage management module 2550 and a track module 2470 to assist with the efficient destaging of tracks, for temporal bits employed with sequential bits for controlling the timing for destaging the track in a primary storage, by transferring the temporal bits and sequential bits from the primary storage to the secondary storage and allowing the temporal bits, which were passed from the primary to the secondary, to age on the secondary storage. The destage management module 2550 and a track module 2470 may work in conjunction with each and every component of the storage controller 2400, the hosts 2100, 2200, 2250, and storage devices 2300. Both the destage management module 2550 and a track module 2470 may be structurally one complete module in a computer storage environment or may be associated and/or included with other individual modules illustrated in the computer storage environment. The destage management module 2550 and the track module 2470 may also be located in the cache 2450 or other components of the storage controller 2400 to accomplish the purposes of the present invention.

The storage controller 2400 includes a control switch 2410 for controlling the fiber channel protocol to the host computers 2100, 2200, 2250, a microprocessor 2420 for controlling all the storage controller 2400, a nonvolatile control memory 2430 for storing a microprogram (operation software) 2500 for controlling the operation of storage controller 2400, data for control and each table described later, cache 2450 for temporarily storing (buffering) data, and buffers 2440 for assisting the cache 2450 to read and write data, a control switch 2410 for controlling a protocol to control data transfer to or from the storage devices 2300, a destage management module 2550 and the track module 2470 in which information may be set. Multiple buffers 2440 may be implemented with the present invention to assist with the mechanisms of the present invention as described herein.

In one embodiment, the host computers or one or more physical or virtual devices, 2100, 2200, 2250 and the storage controller 2400 are connected through a network adaptor (this could be a fibre channel) 2600 as an interface i.e., via a switch called "fabric." In one embodiment, the operation of the system shown in FIG. 4B will be described. The microprocessor 2420 may control the memory 2430 to store command information from the host device (physical or virtual) 2100 and information for identifying the host device (physical or virtual) 2100. The control switch 2410, the buffers 2440, the cache 2450, the operating software 2500, the microprocessor 2420, memory 2430, NVS 2160, and destage management module 2550 and the track module 2470 are in communication with each other and may be separate or one individual component(s). Also, several, if not all of the components, such as the operation software 2450 may be included with the memory 2430 for performing the destage management operations. Each of the components within the devices shown may be linked together and may be in communication with each other for purposes suited to the present invention.

As previously mentioned, the mechanisms of the illustrated embodiments increase the efficiency and performance, for example, by transferring the temporal and sequential bits from a primary storage system to a secondary storage system. This information may be saved and used to age out (by decrementing the temporal bits) tracks in the secondary storage for those tracks that were transferred from the primary storage. The temporal bits on the primary and the secondary storage may be incremented and aged (by decrementing) the transferred tracks from the primary as will be described below in the additional embodiments.

Figure 5:
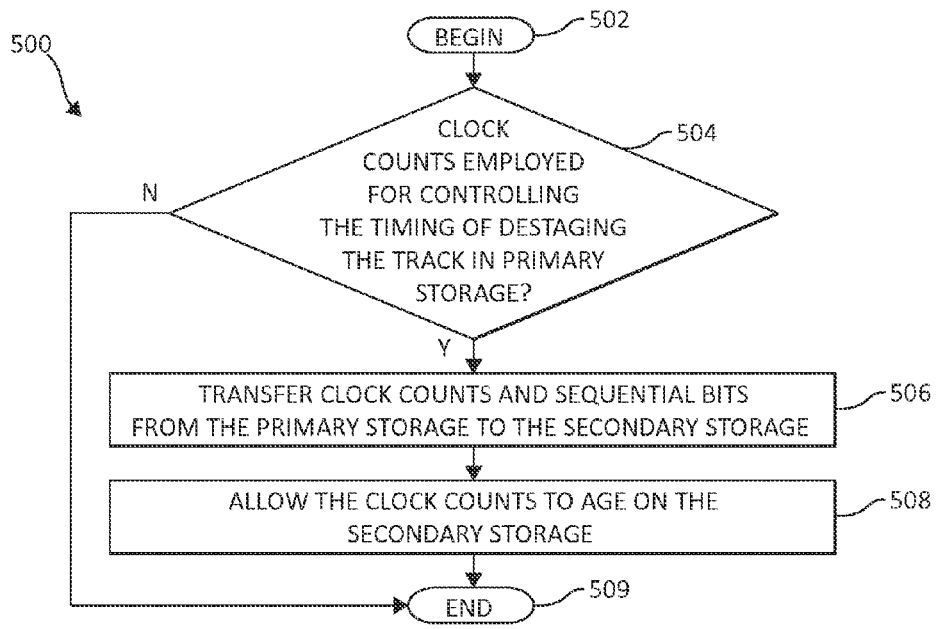
FIG. 5 is a flowchart illustrating an exemplary method for efficient destaging of tracks by sending temporal and sequential bits to a secondary storage.

Turning now to FIG. 5, FIG. 5 is a flowchart illustrating an exemplary method 500 for efficient destaging of tracks by sending temporal and sequential bits to a secondary storage in accordance with one embodiment. The method 500 begins (step 502) by checking if temporal bits are employed for controlling the timing for destaging the track in a primary storage (step 504). If no, the method 500 ends (step 510). Sequential bits are used to zero out the counter bits on X-N track and or X-N strides. If yes, the method 500 will transfer temporal bits and sequential bits from the primary storage to the secondary storage (step 506). Prior to sending/transferring the temporal bits, as described herein, the temporal bits may be incremented to higher values to prevent the continually updated/modified tracks from being prematurely destaged on the primary storage system. The method 500 will allow the temporal bits to age on the secondary storage (step 508). Thus, when the tracks are transferred from the primary storage system to the secondary storage system, this information is no longer lost and may be utilized on the secondary storage to age the temporal bits, as described herein. The aging is performed by decrementing the temporal bits that are transferred from the primary to the secondary storage system and set in the secondary storage. Also, the temporal bits may be incremented to higher values on the secondary storage to assist in preventing the continually updated tracks from being prematurely destaged on the secondary storage system. Thus, the multiple bits may be kept and updated in both the primary storage system and secondary storage system. The method 500 ends (step 510). It should be noted that the clock count is for "controlling" the timings of the destage. The sequential bit is for zeroing the clock count and the clock count also seeks to decrement with the scans and passage of time.

Figure 6:
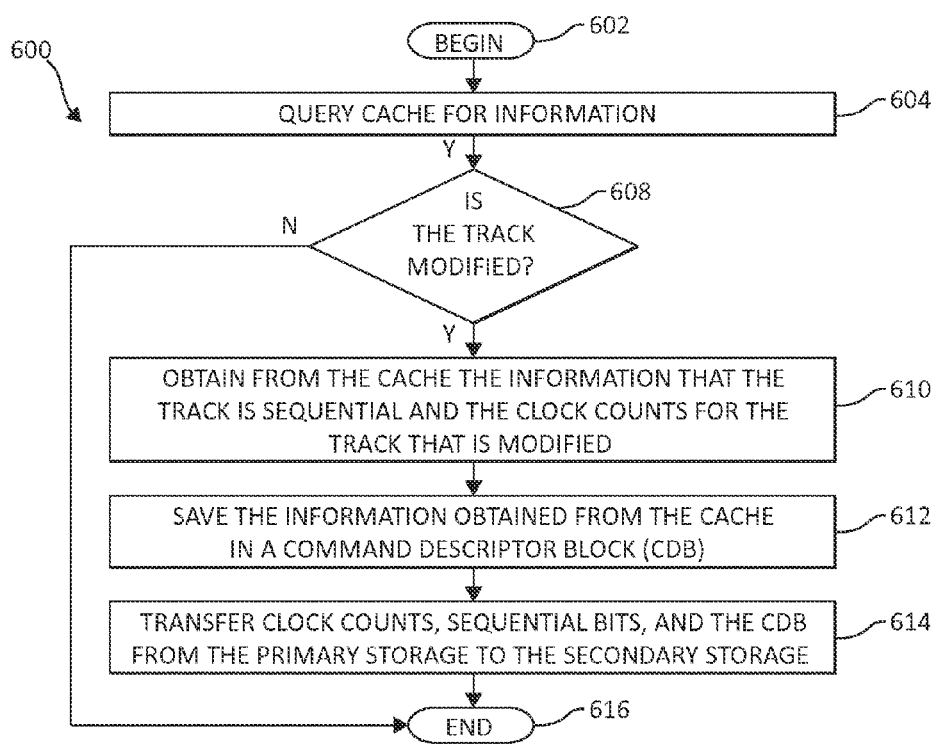
FIG. 6 is a flowchart illustrating an exemplary method for operations performed on a primary storage system in connection with transferring temporal and sequential bits.

In conjunction with the transferring, the mechanisms of the present embodiment execute operations on both the primary and secondary storage. FIG. 6 is a flowchart illustrating an exemplary method 600 for operations performed on a primary storage system in connection with transferring temporal and sequential bits. The method 600 begins (step 602), by performing a query on a cache for information (step 604), for example, on a peer-to-peer remote copy (PPRC). In one embodiment, when a track is being transferred to a secondary storage system, for example, on PPRC secondary, the mechanisms (e.g., a PPRC agent) will query cache for two pieces of the information. The information is a) whether the track is sequential, and b) if the track is modified, the temporal bits). Thus, in querying the cache, the method 600 determines if the track sequential (step 606). The determining whether a track is sequential may be ascertained by the mechanisms as described herein. If no, the method 600 will end (step 616). If yes, the method 600 queries and determines if the track is modified (step 608). If no, the method 600 ends (step 616). Having performed the query, the method 600 will obtain from the cache the information that the track is sequential and the temporal bits for the track that is modified (step 610). The information obtained from the cache is saved, for example, in a command descriptor block (CDB) (step 612). The temporal bits, sequential bits, and the associated CDB are transferred from the primary storage to the secondary storage (step 614). The method 600 end (step 616).

Figure 7:
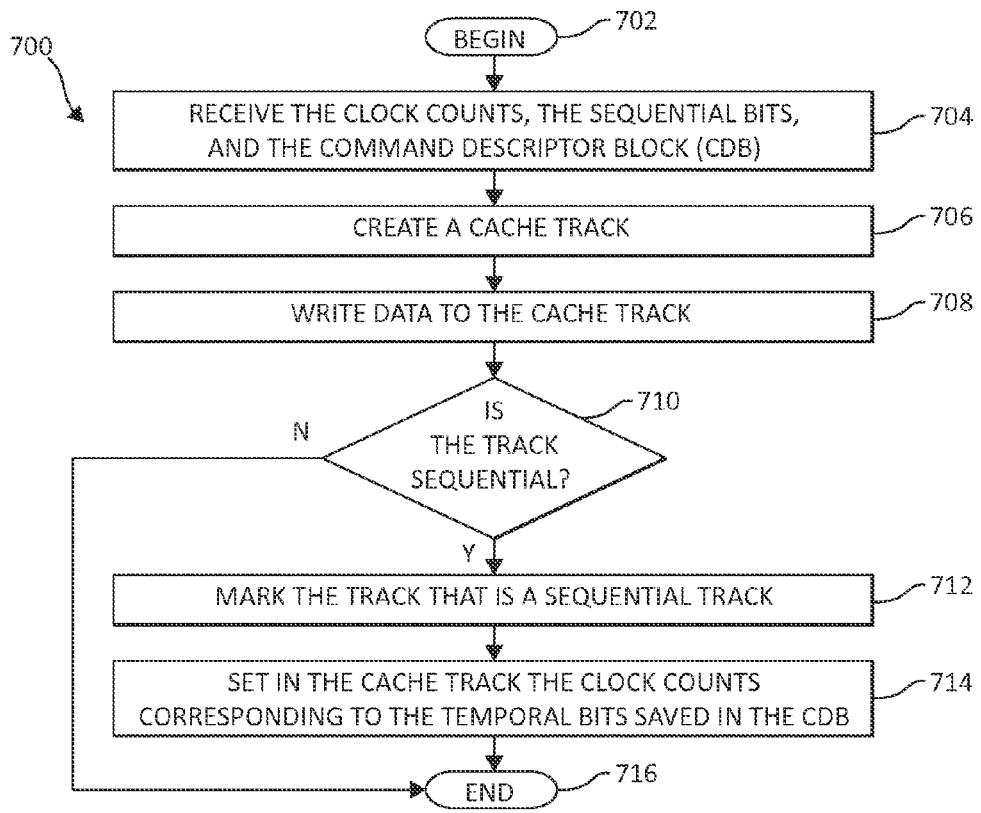
FIG. 7 is a flowchart illustrating an exemplary method for operations performed on a secondary storage system in connection with transferring temporal and sequential bits.

Turning now to FIG. 7, FIG. 7 is a flowchart illustrating an exemplary method 700 for operations performed on a secondary storage system in connection with transferring temporal and sequential bits. The method 700 begins (step 702) by receiving the temporal bits, the sequential bits, and the command descriptor block (CDB) (step 704) that are transferred from the primary storage. A cache track is created (step 706) and data is written to the cache track (708). If the track is sequential (step 710), the sequential track is marked (step 712). The method 700 will set in the cache track the temporal bits corresponding to the temporal bits, that are saved in the CDB, that were passed from the primary storage (step 714). The method 700 ends (step 716).

Thus, in one embodiment, for example, a PPRC secondary storage system receives track data and the associated CDB. The PPRC secondary storage system creates a cache track and writes the track data. The mechanisms processes the two pieces of information saved in the CDB. If the track is sequential then the mechanisms marks the track as sequential. Then, based upon the temporal bits received in the secondary storage, the mechanisms sets the corresponding temporal bits for the track written in the cache. Temporal bits on the secondary storage system are aged out for the transferred tracks from the primary just as they would during a destage scan by decrementing the temporal bits (clock bits).

Figure 8:
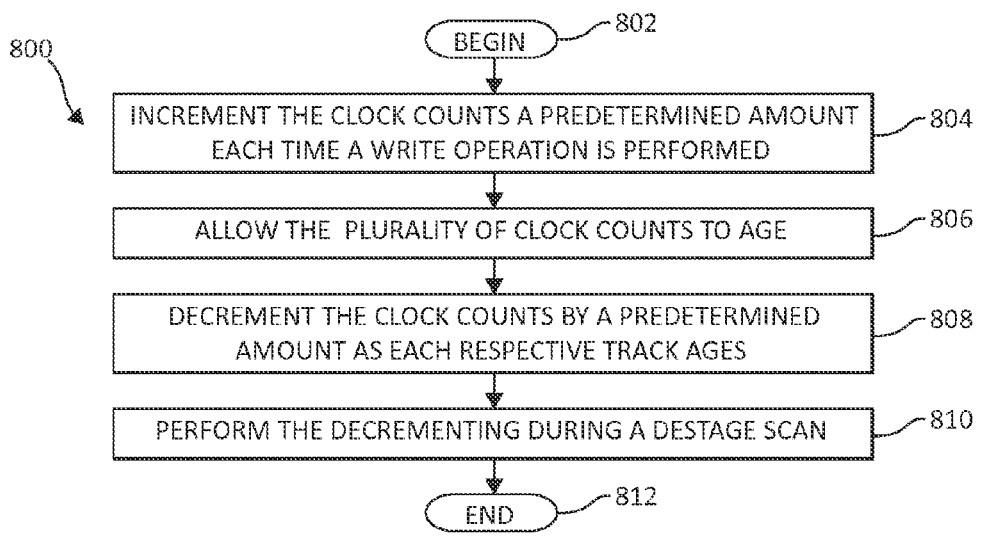
FIG. 8 is a flowchart illustrating an exemplary method for incrementing and aging the temporal bits.

FIG. 8 is a flowchart illustrating an exemplary method 800 for incrementing and aging the temporal bits. The method 800 begins (step 802) by incrementing the temporal bits a predetermined amount each time a write operation is performed (step 804). The incrementing may be performed as described herein. The method 800 will allow the plurality of temporal bits to age (step 806). The aging of the bits may be performed as time passes and as described herein. This may occur either on the primary or on the secondary since the temporal bits (clock bits) and sequential bits are transferred to the secondary storage. The method 800 may decrement the temporal bits by a predetermined amount as each respective track ages (step 808). The method 800 will perform the decrementing during a destage scan (step 810). For example, as a destage scan is performed, the tracks are aged out by decrementing the temporal bits. The method 800 end (step 812).

To illustrate the mechanisms of present invention, an example of one embodiment is provided. The primary storage system may have multiple temporal bits that are updated for tracks that are being written to repeatedly. The incrementing of temporal bits to higher values prevent the continually updated tracks from being prematurely destaged. When the tracks are transferred from the primary storage system to the secondary storage system, the temporal bits and the sequential bits are transferred over to the secondary storage. For example, if the host is writing track A on the primary storage, and the temporal bit is at a value of 15, it is likely that the host will continue to write to this track, as the value of 15 may be representative as a high value in the primary storage. If track A is transferred from the primary to the secondary storage without the temporal bit value of 15 being transferred along with the track, the temporal bit in the secondary storage may be zero and therefore track A may be picked up for destaging too quickly. Thus, if the host writes to track A once again in the primary storage system and then transfers the track to the secondary without the temporal bit value, the track may be once again be destaged too quickly. The second destaging operation of track A on the secondary storage system may cause a destage conflict because there will be another write on top of track A in the secondary storage system. In order to increase the efficiency and reduce the destaging conflicts, the present invention will send the temporal bit values for track A, in this scenario the temporal bit value is 15, from the primary storage to the secondary storage. The temporal bit value may be sent over, for example, in a CDB. It should be noted that because aging of the temporal bit value may occur on the primary, if the host writes to the track thereby incrementing the value of the temporal bit a value of 15, but is not transferred for a period of time, the value may be aged (by decrementing the temporal bit value of 15) to a predetermine value, in this scenario the value may be decremented to a value of 7. Hence, if the track is not written to and incremented during the particular time period the tracks may be aged prior to transfer. Thus, whatever the value of the temporal bit is for track A, at the time of transfer from the primary storage to the secondary storage, will be the value of the temporal bit that will be saved and sent to the secondary storage. For this example, it is assumed that at the time of transfer, the temporal bit still has a value of 15. The transferred track A in the secondary storage will now have a corresponding temporal bit value of 15 in both the primary and secondary storage, thereby preventing the continually updated tracks from being prematurely destaged in the secondary storage. Sending over the temporal bit value in the primary storage, e.g., the value of 15, to the secondary storage preserves the temporality on the secondary storage. Similar to the aging out process that may occur in the primary storage, in the event that track A is not continuously being written to in the secondary storage, track A may be aged out by decrementing the temporal bit in the secondary storage and destaged accordingly.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for efficient track destage in secondary storage in a computing storage environment, comprising:
   a processor device operable in the computing storage environment, wherein processor device is adapted for:
      for a plurality of temporal bits employed with a plurality of sequential bits for controlling the timing for destaging the track in a primary storage:
         transferring the plurality of temporal bits and the plurality of sequential bits from the primary storage to the secondary storage, and
         allowing the plurality of temporal bits to age on the secondary storage.

2. The system of claim 1, wherein the processor device is further adapted for, in conjunction with the transferring, performing on the primary storage at least one of:
   querying a cache for at least one of a determination of whether the track is sequential and, if the track is modified, the plurality of temporal bits, and
   saving the at least one of the determination of whether the track is sequential and, if the track is modified, the plurality of temporal bits in a cache directory control block (CDCB) before the track is transferred.

3. The system of claim 1, wherein the processor device is further adapted for, in conjunction with the transferring, performing on the secondary storage at least one of:
   receiving at least one of the plurality of temporal bits, the plurality of sequential bits, and the CDCB,
   creating a cache track, and
   writing data to the cache track.

4. The system of claim 3, wherein the processor device is further adapted for performing at least one of:
   marking the track if the track is sequential, and
   setting, in the cache track, those of the plurality of temporal bits corresponding to the plurality of bits saved in the CDCB.

5. The system of claim 1, wherein the processor device is further adapted for incrementing the plurality of temporal bits a predetermined amount each time a write operation is performed.

6. The system of claim 1, wherein the allowing the plurality of temporal bits to age on the secondary storage includes decrementing the plurality of temporal bits a predetermined amount as each respective track ages.

7. The system of claim 6, further including performing the decrementing during a destage scan.

8. A computer program product for efficient track destage in secondary storage in a computing storage environment by a processor device, the computer program product comprising a non-transitory computer-readable storage medium having computer-readable program code portions stored therein, the computer-readable program code portions comprising:
   for a plurality of temporal bits employed with a plurality of sequential bits for controlling the timing for destaging the track in a primary storage:
      a first executable portion for transferring the plurality of temporal bits and the plurality of sequential bits from the primary storage to the secondary storage; and
      a second executable portion for allowing the plurality of temporal bits to age on the secondary storage.

9. The computer program product of claim 8, further including a third executable portion for, in conjunction with the transferring, performing on the primary storage at least one of:
   querying a cache for at least one of a determination of whether the track is sequential and, if the track is modified, the plurality of temporal bits, and
   saving the at least one of the determination of whether the track is sequential and, if the track is modified, the plurality of temporal bits in a cache directory control block (CDCB) before the track is transferred.

10. The computer program product of claim 8, further including a third executable portion for, in conjunction with the transferring, performing on the secondary storage at least one of:
   receiving at least one of the plurality of temporal bits, the plurality of sequential bits, and the CDCB,
   creating a cache track, and
   writing data to the cache track.

11. The computer program product of claim 10, further including a fourth executable portion for performing at least one of:
   marking the track if the track is sequential, and setting, in the cache track, those of the plurality of temporal bits corresponding to the plurality of bits saved in the CDCB.

12. The computer program product of claim 11, further including a third executable portion for incrementing the plurality of temporal bits a predetermined amount each time a write operation is performed.

13. The computer program product of claim 8, wherein the allowing the plurality of temporal bits to age on the secondary storage includes a third executable portion for decrementing the plurality of temporal bits a predetermined amount as each respective track ages, wherein the decrementing occurring during a destage scan.

* * * * *